United States Patent
Kuroiwa et al.

(10) Patent No.: US 9,727,039 B2
(45) Date of Patent: Aug. 8, 2017

(54) FACILITY MANAGEMENT DEVICE, FACILITY MANAGEMENT SYSTEM, FACILITY MANAGEMENT METHOD, AND PROGRAM

(75) Inventors: Takeru Kuroiwa, Tokyo (JP); Taichi Ishizaka, Tokyo (JP); Shigeki Suzuki, Tokyo (JP); Takahiro Ito, Tokyo (JP); Noriyuki Komiya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 354 days.

(21) Appl. No.: 14/370,171

(22) PCT Filed: Jan. 30, 2012

(86) PCT No.: PCT/JP2012/051948
§ 371 (c)(1),
(2), (4) Date: Jul. 1, 2014

(87) PCT Pub. No.: WO2013/114525
PCT Pub. Date: Aug. 8, 2013

(65) Prior Publication Data
US 2014/0330437 A1    Nov. 6, 2014

(51) Int. Cl.
G05B 15/02    (2006.01)
H04L 12/28    (2006.01)
H04L 12/26    (2006.01)

(52) U.S. Cl.
CPC .......... *G05B 15/02* (2013.01); *H04L 12/2803* (2013.01); *H04L 43/0817* (2013.01); *H04L 43/106* (2013.01)

(58) Field of Classification Search
None
See application file for complete search history.

(56) References Cited

U.S. PATENT DOCUMENTS 6,578,169 B1 *  6/2003  Le .......................... G11C 29/56
                                                              714/723
2004/0054776 A1   3/2004  Klotz et al.
(Continued)

FOREIGN PATENT DOCUMENTS

CN    101196334 A    6/2008
CN    101933314 A    12/2010
(Continued)

OTHER PUBLICATIONS

Extended European Search Report dated Sep. 10, 2015 issued in corresponding EP patent application No. 12867365.4.
(Continued)

*Primary Examiner* — Tuan Dao
(74) *Attorney, Agent, or Firm* — Posz Law Group, PLC

(57) ABSTRACT

A facility management device manages communication data that is transmitted and received between remote controllers and an outdoor unit and/or indoor units. A temporary-memory controller stores communication data that was received by a communicator, and transmission-waveform data that was acquired by a transmission-waveform data acquirer for a specified amount of time in a temporary memory. An abnormality determiner determines whether or not there is abnormality in the communication data that is stored in the temporary memory. When it is determined that there is abnormality in the communication data stored in the temporary memory, a data copier stores all of the data that is stored in the temporary memory in an abnormal-data memory.

10 Claims, 8 Drawing Sheets

(56) References Cited

U.S. PATENT DOCUMENTS

| | | | |
|---|---|---|---|
| 2006/0080379 A1 | 4/2006 | Song et al. | |
| 2007/0213629 A1* | 9/2007 | Greene | A61B 5/4094 600/544 |
| 2009/0018610 A1* | 1/2009 | Gharib | A61B 5/04001 607/48 |
| 2010/0332917 A1* | 12/2010 | Konno | G06Q 10/06 714/49 |
| 2011/0051789 A1 | 3/2011 | Kuroiwa et al. | |
| 2011/0077086 A1* | 3/2011 | Grube | A63F 13/12 463/42 |

FOREIGN PATENT DOCUMENTS

| | | |
|---|---|---|
| JP | 2006-054755 A | 2/2006 |
| JP | 2006-109487 A | 4/2006 |
| JP | 2007-318471 A | 12/2007 |
| JP | 2011-035738 A | 2/2011 |
| JP | 2011-223154 A | 11/2011 |
| JP | 2011-239147 A | 11/2011 |

OTHER PUBLICATIONS

Office Action mailed Oct. 21, 2014 issued in corresponding JP patent application No. 2013-556068 (and English translation).
International Search Report of the International Searching Authority mailed Feb. 21, 2012 for the corresponding international application No. PCT/JP2012/051948 (and English translation).
Office Action dated Feb. 3, 2017 issued in corresponding CN patent application No. 201280068464.5 (and partial English translation).
Office Action dated Aug. 18, 2016 issued in corresponding CN patent application No. 201280068464.5 (and partial English translation).

* cited by examiner

FIG.2
| COMMUNICATION TIME STAMP | COMMUNICATION DATA | CONTROL-TARGET ID | CONTROL STATE | LABEL |
|---|---|---|---|---|
| 2011/01/23 4:56:02 | 00 01 02 03 ··· | OUTDOOR UNIT 110 | OPERATION STOPPED | L01 |
| 2011/01/23 4:56:04 | 0D 0E 0F 10 ··· | INDOOR UNIT 120a | COOLING ON | L02 |
| 2011/01/23 4:56:05 | 00 01 02 03 ··· | OUTDOOR UNIT 110 | OPERATION STOPPED | L03 |
| 2011/01/23 4:56:07 | 2D 2E 2F 20 ··· | REMOTE CONTROLLER 130b | FAN | L04 |
| ⋮ | ⋮ | ⋮ | ⋮ | ⋮ |
| WAVEFORM TIME STAMP | TRANSMISSION-WAVEFORM DATA | LABEL |
|---|---|---|
| 2011/01/23 4:56:02 |  | L01 |
| 2011/01/23 4:56:04 |  | L02 |
| 2011/01/23 4:56:05 |  | L03 |
| 2011/01/23 4:56:07 |  | L04 |
| ⋮ | ⋮ | ⋮ |

FIG.3

| FACILITY EQUIPMENT ID | TIME STAMP | COMMUNICATION DATA | TRANSMISSION-WAVEFORM DATA |
|---|---|---|---|
| INDOOR UNIT 120a | 2011/01/23 4:56:02 | 00 01 02 03 ··· | |
| REMOTE CONTROLLER 130a | 2011/01/23 4:56:04 | 0D 0E 0F 10 ··· | |
| ⋮ | ⋮ | ⋮ | ⋮ |

FIG.4

ABNORMAL-DATA MEMORY 330

| TIME STAMP 340 | ABNORMAL FACILITY EQUIPMENT ID 350 | ABNORMALITY TYPE 360 |
|---|---|---|
| 2011/01/23 4:56:05 | OUTDOOR UNIT 110 | PARITY ERROR |

ABNORMAL DATA 370

| COMMUNICATION TIME STAMP 371 | COMMUNICATION DATA 372 | CONTROL-TARGET ID 373 | CONTROL STATE 374 | LABEL 377 |
|---|---|---|---|---|
| 2011/01/23 4:56:02 | 00 01 02 03 ⋯ | OUTDOOR UNIT 110 | OPERATION STOPPED | L01 |
| 2011/01/23 4:56:04 | 0D 0E 0F 10 ⋯ | INDOOR UNIT 120a | COOLING ON | L02 |
| 2011/01/23 4:56:05 | 00 01 02 03 ⋯ | INDOOR UNIT 120a | OPERATION STOPPED | L03 |
| 2011/01/23 4:56:07 | 2D 2E 2F 20 ⋯ | REMOTE CONTROLLER 130b | FAN | L04 |
| ⋮ | ⋮ | ⋮ | ⋮ | ⋮ |

| WAVEFORM TIME STAMP 375 | TRANSMISSION-WAVEFORM DATA 376 | LABEL 377 |
|---|---|---|
| 2011/01/23 4:56:02 | ⎍⎍⎍ | L01 |
| 2011/01/23 4:56:04 | ⎍⎍⎍ | L02 |
| 2011/01/23 4:56:05 | ⎍⎍⎍ | L03 |
| 2011/01/23 4:56:07 | ⎍⎍⎍ | L04 |
| ⋮ | ⋮ | ⋮ |

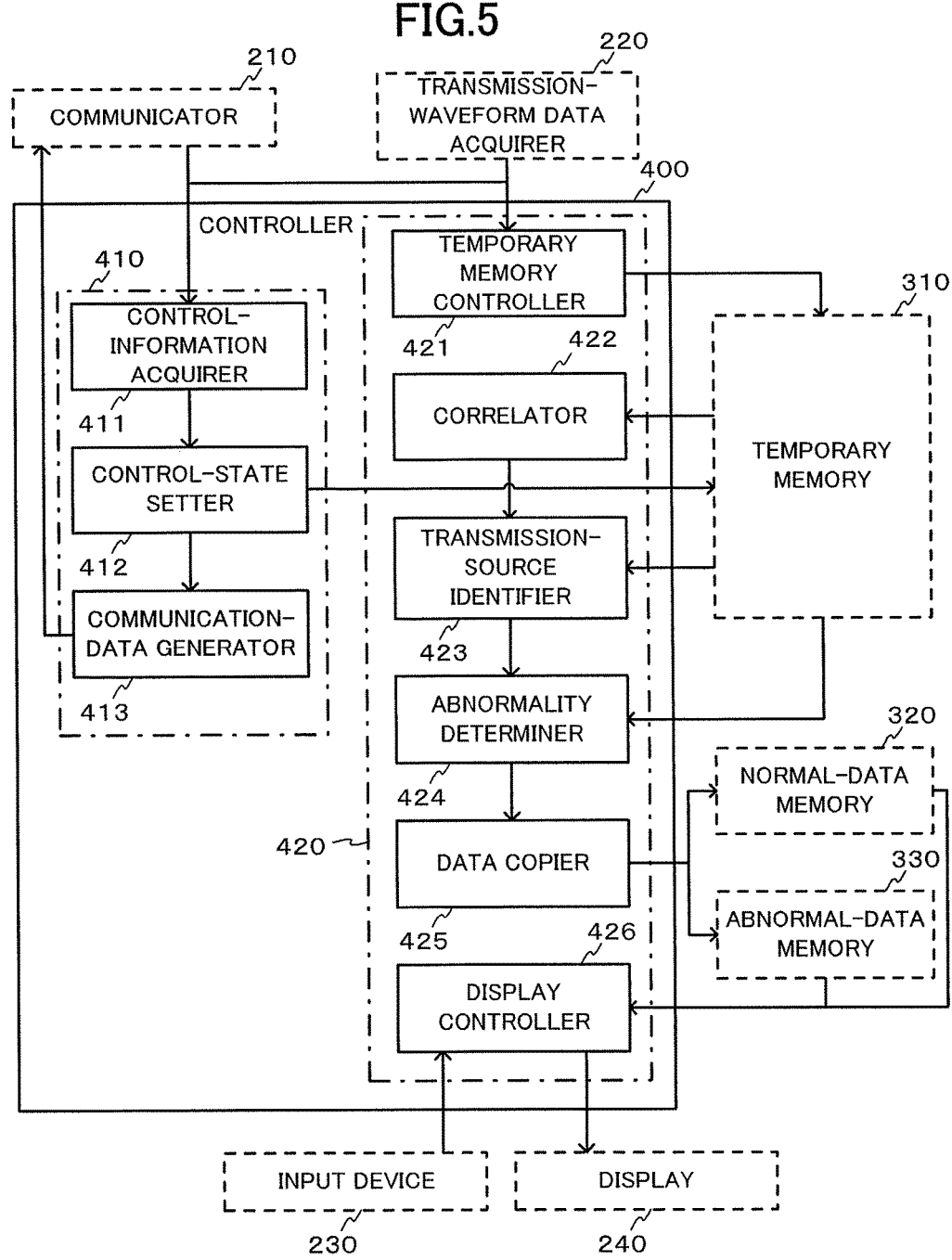

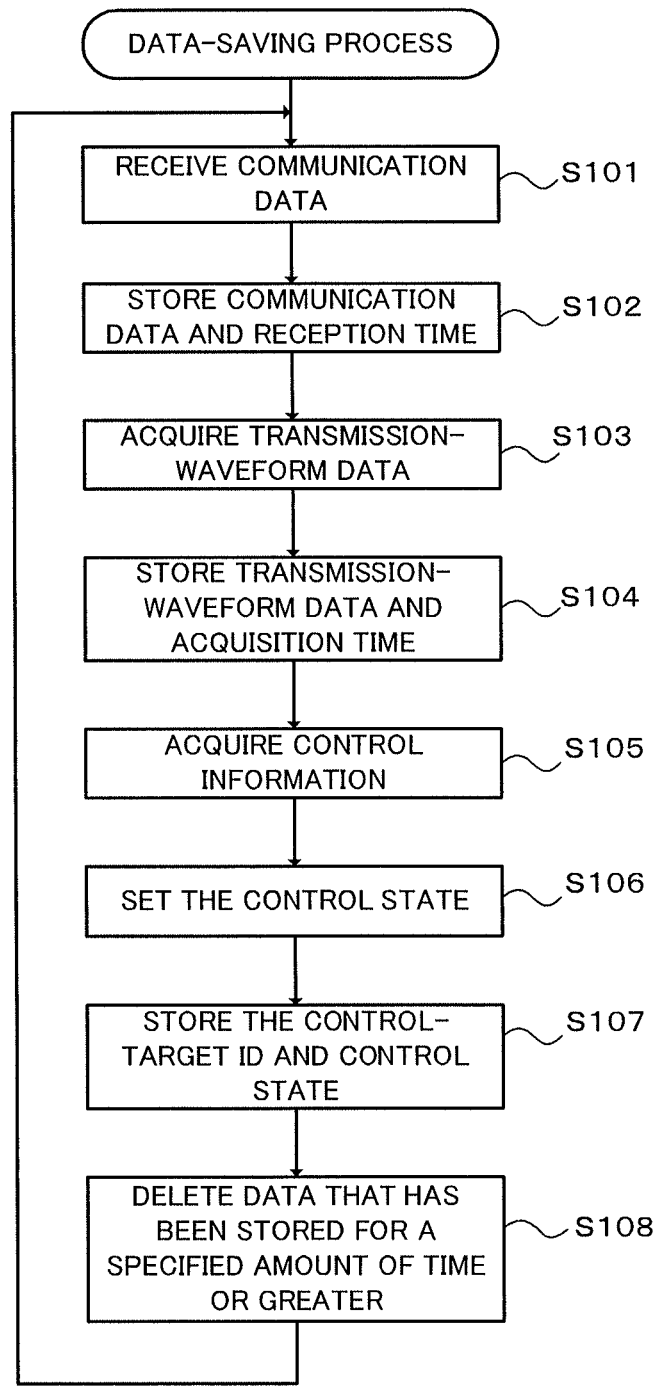

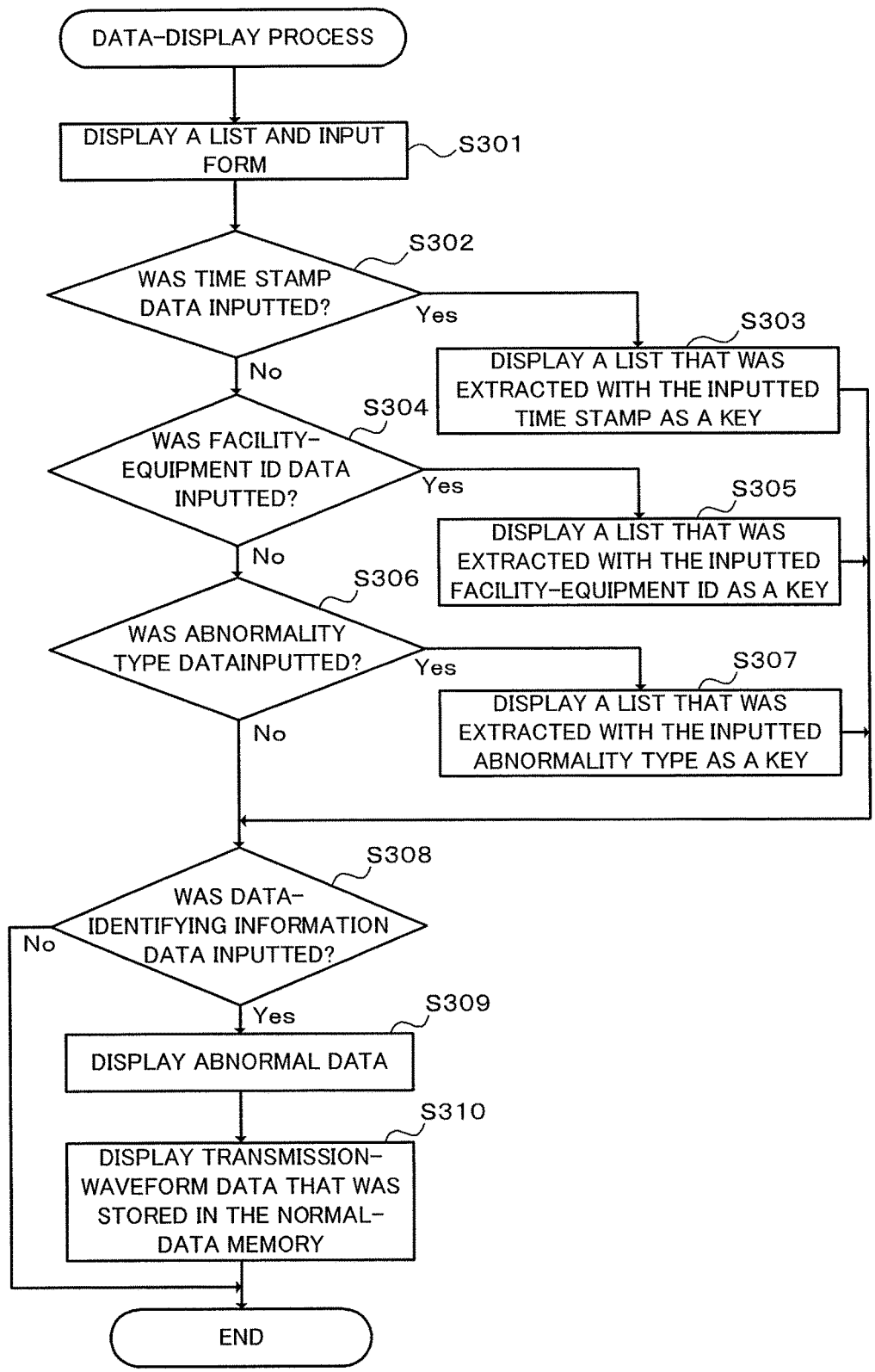

FACILITY MANAGEMENT DEVICE, FACILITY MANAGEMENT SYSTEM, FACILITY MANAGEMENT METHOD, AND PROGRAM

CROSS REFERENCE TO RELATED APPLICATION

This application is a U.S. national stage application of International Patent Application No. PCT/JP2012/051948 filed on Jan. 30, 2012.

TECHNICAL FIELD

The present disclosure relates to a facility management device, facility management system, facility management method, and program for managing communication data that is transmitted and received between a plurality of facility equipment.

BACKGROUND

Abnormal communication in a communication system that is used in controlling facility equipment such as air-conditioning equipment and lighting equipment includes abnormal communication at a physical layer level in which, due to the shape of the transmission waveform on a transmission path becoming distorted for some reason, it becomes impossible to maintain the contents of a signal that was generated by a terminal at the transmission source until that signal arrives at a terminal at the transmission destination. In order to identify the cause of this kind of abnormal communication on a physical layer level, and to restore the communication system, being able to acquire and analyze the waveform at the instant that abnormal communication occurs is desirable.

An oscilloscope is known as a typical device for acquiring and analyzing a transmission waveform. In a typically sold oscilloscope, the voltage level can be set as a condition for acquiring the transmission waveform, however, this condition is not necessarily related to abnormal communication. Moreover, abnormal communication often occurs irregularly, and it is difficult to predict the timing at which an abnormality will occur. Therefore, it is very difficult to acquire the transmission waveform at the instant when abnormal communication occurs, which places a large burden on a worker that is trying to deal with the abnormal communication.

As technology for reducing this burden, Patent Literature 1 discloses an abnormal communication detection apparatus that acquires the transmission waveform when abnormal communication occurs by detecting abnormal communication by analyzing received communication data according to the protocol of the communication system, and recording the transmission waveform before and after the time of occurrence of a trigger signal that is generated as a trigger indicating that abnormal communication was detected.

Moreover, Patent Literature 2 discloses a communication state analysis system that makes analysis of the communication state more efficient by making it possible to reproduce the communication state by storing received communication data together with the time of reception, and transmitting that communication data in accordance to the reception time.

PATENT LITERATURE

Patent Literature 1: Unexamined Japanese Patent Application Kokai Publication No. 2007-318471

Patent Literature 2: Unexamined Japanese Patent Application Kokai Publication No. 2006-054755

Technical Problem

The apparatus that is disclosed in Patent Literature 1 comprises a function for acquiring the transmission waveform at the instant when abnormal communication occurred. The apparatus, however, does not take into consideration reproducing the communication abnormality that was the cause. Therefore, in the case of abnormal communication that has a very low frequency of occurrence, there is a problem in that acquiring the desired transmission waveform takes a very long time.

Moreover, in the case of the apparatus disclosed in Patent Literature 2, in order to make the reproduction of the communication state more efficient, not only is the type of communication data on the transmission path and the transmission time in accordance with the reception time, but also the position of the facility equipment that is the transmission source of communication data and the number of facility equipment that are connected to the communication system are related to the communication state, so there is a problem with reproducibility.

SUMMARY

Taking into consideration the situation described above, the object of the present disclosure is to provide a facility management device, facility management system, facility management method, and program capable of reducing the burden placed on a worker that is trying to deal with abnormal communication between facility equipments.

In order to accomplish the object above, the facility management device of this disclosure is a facility management device that manages communication data that is transmitted and received between a plurality of facility equipment, comprising:

a communicator that receives the communication data;

a temporary-memory controller that causes the communication data that was received by the communicator to be stored for a specified amount of time in a temporary memory;

an abnormality determiner that determines whether or not there is abnormality in the communication data that is stored in the temporary memory; and a data copier that, when the abnormality determiner determined that there is abnormality in the communication data, causes the communication data that is stored in the temporary memory to be stored in an abnormal-data memory.

With the present disclosure, it is possible to reduce the burden on a worker that is dealing with abnormal communication between facility equipments.

BRIEF DESCRIPTION OF DRAWINGS

FIG. 2 is a drawing that illustrates an example of data that is stored in a temporary memory;

FIG. 3 is a drawing that illustrates an example of data that is stored in a normal-data memory;

FIG. 4 is a drawing that illustrates an example of data that is stored in an abnormal-data memory;

FIG. 5 is a block diagram that illustrates the functional construction of a controller;

FIG. 6 is an example of a flowchart of a data-saving process;

FIG. 8 is an example of a flowchart of a data-display process.

DETAILED DESCRIPTION

An embodiment of the present disclosure will be explained in detail with reference to the drawings.

Figure 1:
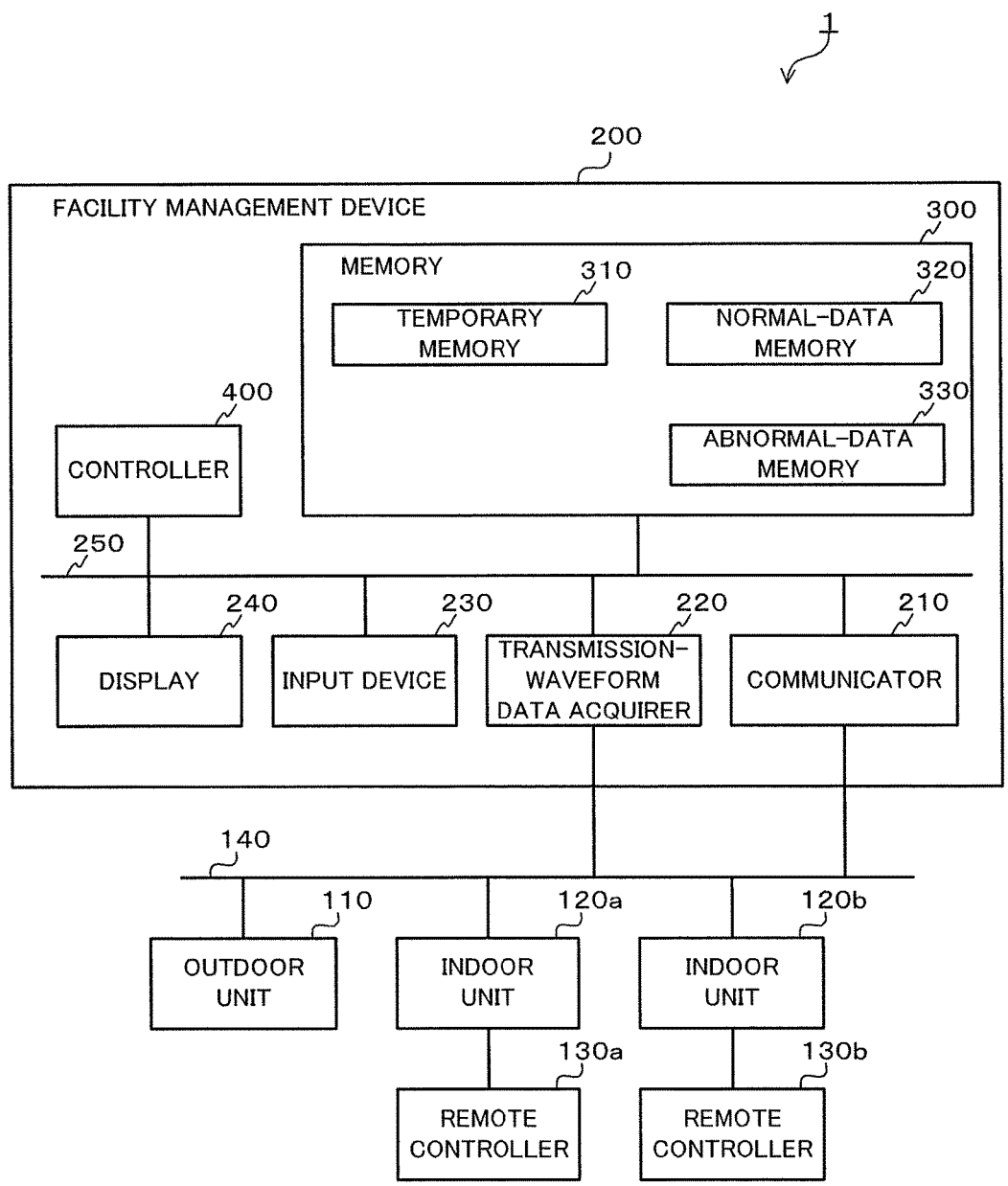
FIG. 1 is a block diagram that illustrates the construction of a facility management system of an embodiment of the present disclosure.

FIG. 1 is a drawing that illustrates the construction of a facility management system 1 of an embodiment of the present disclosure. The facility management system 1 is a system that manages air conditioners as an example of facility equipment. As illustrated in FIG. 1, the facility management system 1 comprises: an outdoor unit 110, indoor units 120a, 120b, remote controllers 130a, 130b, and a facility management device 200 as a plurality of facility equipment. The outdoor unit 110, indoor units 120a, 120b, remote controllers 130a, 130b and facility management device 200 are connected by a communication line 140 so as to be able to perform data communication with each other. FIG. 1 illustrates one outdoor unit 110, two indoor units 120a, 120b, and two remote controllers 130a, 130b, however, the number of facility equipment is not limited to this.

The outdoor unit 110 and indoor units 120a, 120b are units that adjust the temperature and humidity of the air inside a room where the indoor units 120a, 120b are installed. The outdoor unit 110 and indoor units 120a, 120b are connected to each other by way of coolant piping (not illustrated in the drawing) that is used for circulating coolant. Moreover, the outdoor unit 110 and indoor units 120a, 120b are connected to each other by a communication line 140 that is used for transmitting and receiving data.

The remote controllers 130a, 130b are terminals for a user to operate the indoor units 120a, 120b. The remote controllers 130a, 130b receive operation input from the user in order to set the operating mode such as cooling or heating, and set the target temperature and the like. The remote controllers 130a, 130b also transmit to the outside operation signals (for example, infrared ray signals) that correspond to the received operation input. The indoor units 120a, 120b that receive the operation signal operate according to that operation signal.

The communication line 140 connects the outdoor unit 110, the indoor units 120a, 120b, the remote controllers 130a, 130b and the facility management device 200 so that data communication is possible. The communication line 140 can be wired or wireless.

The communication data that is transmitted over the communication line 140 includes a facility equipment ID that corresponds to the facility equipment that is the transmission source of the transmission data, a facility equipment ID that corresponds to the facility equipment that is the control target, and information (control information) necessary for controlling the facility equipment that is the control target. A facility equipment ID is information for identifying facility equipment of this embodiment, which includes the outdoor unit 110, indoor units 120a, 120b and remote controllers 130a, 130b, and is set in advance to correspond to the respective facility equipment. The control information represents, for example, the operation input received by a remote controller 130, outdoor temperature, and indoor temperature.

The facility management device 200 is a device that, based on the communication data that is received via the communication line 140, performs overall control of the outdoor unit 110 and indoor units 120a, 120b. The facility management device 200 comprises a communicator 210, a transmission-waveform data acquirer 220, an input device 230, a display 240, a memory 300, and a controller 400; and each component is connected by a bus 250.

The communicator 210 comprises an interface for transmitting communication data to or receiving communication data from the outdoor unit 110, indoor units 120a, 120b and remote controllers 130a, 130b via the communication line 140.

The transmission-waveform data acquirer 220 acquires transmission-waveform data for communication data that is transmitted over the communication line 140. The transmission-waveform data acquirer 220 comprises, for example, a digital oscilloscope.

The input device 230 comprises input devices such as buttons, a touch panel, a keyboard and the like. The input device 230 receives operation input from a user, and outputs an operation-input signal that corresponds to the received operation input to the controller 260.

The display 240 is a display device that comprises a LCD (Liquid Crystal Display), a backlight and the like. The display 240, under the control of the controller 260, displays, for example, data that is stored in the memory 250.

The memory 300 comprises a memory device such as a hard disc drive. The memory 300 comprises: a temporary memory 310, a normal-data memory 320 and an abnormal-data memory 330.

The temporary memory 310 stores communication data that is received by the communicator 210 and transmission-waveform data that is acquired by the transmission-waveform data acquirer 220. The communication data and the transmission-waveform data that are stored in the temporary memory 310 are deleted under the control of the controller 400 after a specified amount of time has elapsed after being stored in the temporary memory 310. In other words, communication data and transmission-waveform data for the most recent specified amount of time are stored in the temporary memory 310.

FIG. 2 is a drawing that illustrates an example of data that is stored in the temporary memory 310. The temporary memory 310 illustrated in FIG. 1 includes a communication time stamp 311, communication data 312, control target ID 313, control state 314, waveform time stamp 315, transmission-waveform data 316 and label 317. The communication time stamp 311 indicates the time at which the communication data 312 was received. The control target ID 313 is included in the communication data 312 and indicates the facility equipment ID that corresponds to the facility equipment that is the control target. The control state 314 is set by the control information that is included in the communication data 312, and indicates the control state of the facility equipment that corresponds to the control target ID 313. The control state, for example, is cooling, heating, operation stopped and operation started. The waveform time stamp 315 indicates the time at which the transmission-waveform data 316 was received. The label 317 indicates that the communication data 312 and transmission-waveform data 316 correspond with each other, or in other words, indicates that the source data of the communication data 312 and the source data of the transmission-waveform data 316 are the same. More specifically, communication data 312 and transmission-waveform data 316 to which the same label 317 is attached have the same source data.

The normal-data memory 320 stores communication data that has been determined to have no abnormality, and transmission-waveform data for that data. FIG. 3 is a drawing that illustrates an example of data that is stored in the normal-data memory 320. The normal-data memory 320 illustrated in FIG. 3 correlates and stores communication data 321, transmission-waveform data 322 for that communication data, a time stamp 323 that indicates the time at which the communication data and transmission-waveform data were received and a facility equipment ID 324 that corresponds to the facility equipment that is the transmission source of that communication data.

The abnormal-data memory 330 stores communication data that has been determined to have abnormality and the transmission-waveform data for that transmission-waveform data. FIG. 4 is a drawing that illustrates an example of data that is stored in the abnormal-data memory 330. The abnormal-data memory 330 illustrated in FIG. 4 correlates and stores a time stamp 340, abnormal facility equipment ID 350, abnormality type 360 and abnormal data 370.

The time stamp 340 indicates the time at which communication data that has been determined to have abnormality was received. The abnormal facility equipment ID 350 indicates the facility equipment ID that corresponds to the facility equipment that is the transmission source of communication data that has been determined to have abnormality. The abnormality type 360 indicates the type of abnormality of communication data that has been determined to have abnormality. Abnormality of communication data in this embodiment is an error that is defined by the communication protocol; for example, is a parity-bit error, check-sum error, short packet or the like.

Abnormal data 370 includes a communication time stamp 371, communication data 372, a control target ID 373, control state 374, a waveform time stamp 375, transmission-waveform data 376 and a label 377. The communication time stamp 371 indicates the time at which the communication data 372 was received. The control target ID 373 indicates the facility equipment ID that corresponds to the facility equipment that is the control target and is included in the communication data 372. The control state 374 is set by the control information that is included in the communication data 372, and indicates the control state of the facility equipment that corresponds to the control target ID 373. The waveform time stamp 375 indicates the time at which the transmission waveform 376 was received. The label 377 indicates that the communication data 372 and transmission-waveform data 373 correspond to each other.

The structure of the data that is stored in the temporary memory 310, normal-data memory 320 and abnormal-data memory 330 is not limited to the structure of this embodiment. The structure of the data that is stored in each of the memories can be achieved by a hash table function that is implemented in the programming language. Moreover, the temporary memory 310, normal-data memory 320 and abnormal-data memory 330 can have a table that correlates each item of data with an array index, and can store data as an array.

Furthermore, the memory 300 can comprise a writable storage device such as a RAM (Random Access Memory), flash memory or SSD (Solid State Drive). This storage device can be constructed such that logical partitioning is performed in the same storage device, or can be constructed such that the stored information is divided into files in the same storage device. The temporary memory 310, normal-data memory 320 and abnormal-data memory 330 can each comprise a separate storage device.

Returning to FIG. 1, the controller 400 comprises, for example, a CPU (Central Processing Unit), a ROM (Read Only Memory) that stores programs that are executed by the CPU, a RAM that temporarily stores data that is generated by the CPU and a timer that counts the current time; and the controller 400 performs overall control of the facility management device 200.

FIG. 5 is a block diagram that illustrates the functional construction of the controller 400. As illustrated in FIG. 5, the controller 400 functions as an operation controller 410 and a communication-data analyzer 420.

The operation controller 410 controls the operation of the outdoor unit 110 and the indoor units 120a, 120b. More specifically, the operation controller 410 comprises a control-information acquirer 411, a control-state setter 412 and a communication-data generator 413.

The control-information acquirer 411 acquires control information that is included in the communication data received via the communicator 210.

The control-state setter 412, based on the control information that was acquired by the control-information acquirer 411, sets the control state for the outdoor unit 110 and indoor units 120a, 120b.

The communication-data generator 413 generates communication data for the outdoor unit 110 and indoor units 120a, 120b to be controlled in the control state that was set by the control-state setter 412. The communication data that was generated by the communication-data generator 413 is transmitted via the communicator 210 to the outdoor unit 110 and indoor units 120a, 120b, which are the control targets.

The communication-data analyzer 420, based on the analysis result of communication data that was received by the communicator 210, controls the storage in the memory 300 of communication data that was received by the communicator 210 and transmission-waveform data that was acquired by the transmission-waveform data acquirer 220. More specifically, the communication-data analyzer 420 comprises a temporary-memory controller 421, a correlator 422, a transmission-source identifier 423, an abnormality determiner 424, a data copier 425 and a display controller 426.

The temporary-memory controller 421 causes communication data that was received by the communicator 210 and transmission-waveform data that was acquired by the transmission-waveform data acquirer 220 to be stored in the temporary memory 310. More specifically, the temporary-memory controller 421, as illustrated in FIG. 2, causes communication data that was received by the communicator 210 to be stored as communication data 312, and causes the time at which that communication data was received to be stored as the communication time stamp 311 in the temporary memory 310. Moreover, the temporary-memory controller 421 causes transmission-waveform data that was acquired by the transmission-waveform data acquirer 220 to be stored as transmission-waveform data 316, and causes the time at which that transmission-waveform data was acquired to be stored as a waveform time stamp 315 in the temporary memory 310.

Furthermore, of the data stored in the temporary memory 310, the temporary-memory controller 421 deletes data that has been stored in the temporary memory 421 for a specified amount of time.

The correlator 422 correlates the communication data 312 that is stored in the temporary memory 310 with the transmission-waveform data 316 so that the data having the same source data correspond with each other. The correlator 422 attaches a label 317 to the correlated communication data 312 and transmission-waveform data 316 to indicate that both correspond to each other.

More specifically, the correlator 422 correlates the communication data 312 that is stored in the temporary memory 310 and the transmission-waveform data 316 of the waveform time stamp 315 that is the closest to the communication time stamp 311 of the communication data 312. However, the method used by the correlator 422 to correlate the communication data 312 and the transmission-waveform data 316 is not limited to this. For example, the correlator 422 can acquire communication data by applying a specified bit judgment algorithm to the transmission-waveform data 316 that is stored in the temporary memory 310. Moreover, when it is determined that communication data 312 that is the same as the acquired communication data is stored in the temporary memory 310, the correlator 422 can correlate that transmission-waveform data 316 with the communication data 312 that is determined to be stored in the temporary memory 310.

The transmission-source identifier 423 analyses communication data and identifies the facility equipment that is the transmission source of that communication data. More specifically, the transmission-source identifier 423 acquires the facility equipment ID of the transmission source of communication data from that communication data.

The abnormality determiner 424 analyzes communication data 312 that is stored in the temporary memory 310 and determines whether or not there is any abnormality in that communication data. More specifically, the abnormality determiner 424 analyses communication data 312 that is stored in the temporary memory 310, and determines whether or not there is any error that is defined by the communication protocol, and determines the type of error.

The data copier 425, based on the determination results by the abnormality determiner 424, causes data that is stored in the temporary memory 310 to be stored in the normal-data memory 320 or abnormal-data memory 330. More specifically, when the abnormality determiner 424 has determined that there is abnormality in communication data, the data copier 425 causes all of the data that is stored in the temporary memory 310 to be stored in the abnormal-data memory 330 as abnormal data 370. When the abnormality determiner 424 has determined that there is no abnormality in communication data, the data copier 425 causes communication data that was determined to have no abnormality and transmission-waveform data that corresponds to that communication data to be stored in the normal-data memory 320.

The display controller 426, based on operation input from a user, causes data that is stored in the normal-data memory 320 and abnormal-data memory 330 to be output and displayed on the display 240.

Next, the operation of the facility management device 200 of this embodiment will be explained. The controller 400 of the facility management device 200 executes a data-saving process, a data-analysis process and data-display process. These processes are executed, for example, by the CPU of the controller 400 reading programs that are stored in the ROM.

First, the data-saving process will be explained. The data-saving process is a process for saving communication data that was received by the facility management device 200 and the transmission-waveform data for that communication data in the temporary memory 310. FIG. 6 is an example of a flowchart of the data-saving process. The data-saving process, for example, starts when a user inputs operation input via the input device 230 that indicates the start of execution of the data-saving process.

The temporary-memory controller 421, via the communicator 210, receives communication data that is transmitted on the communication line 140 (step S101).

The temporary-memory controller 421 causes the communication data that was received in step S101 to be saved as communication data 312, and the time at which that communication data was received to be saved as the communication time stamp 311 in the temporary memory 310 (step S102).

The temporary-memory controller 421, via the transmission-waveform data acquirer 220, acquires transmission-waveform data for the communication data (step S103).

The temporary-memory controller 421 causes the transmission-waveform data that was acquired in step S103 to be saved as transmission-waveform data 316, and the time at which that transmission-waveform data was acquired to be saved as the waveform time stamp 315 in the temporary memory 310 (step S104).

The control-information acquirer 411 analyzes the communication data that was received in step S101, and acquires control information (step S105).

The control-state setter 412, based on the control information that was acquired in step S105, sets the control state of the facility equipment that corresponds to the control target ID that is included in the communication data that was received in step S101 (step S106).

The control-state setter 412 causes the control target ID that is included in the communication data received in step S101 to be saved as the control target ID 313, and the control state that was set in step S106 to be saved as the control state 314 in the temporary memory 310, and correlates that data with the communication data that was stored in the temporary memory 310 in step S102 (step S107).

The temporary-memory controller 421 deletes data from the temporary memory 310 when a specified amount of time or greater has elapsed from the times indicated by the communication time stamp 311 and waveform time stamp 315 based on the current time that is counted by the timer of the controller 400 (step S108). The temporary-memory controller 421 then returns to step S101 and repeats steps S101 to S108.

Figure 7:
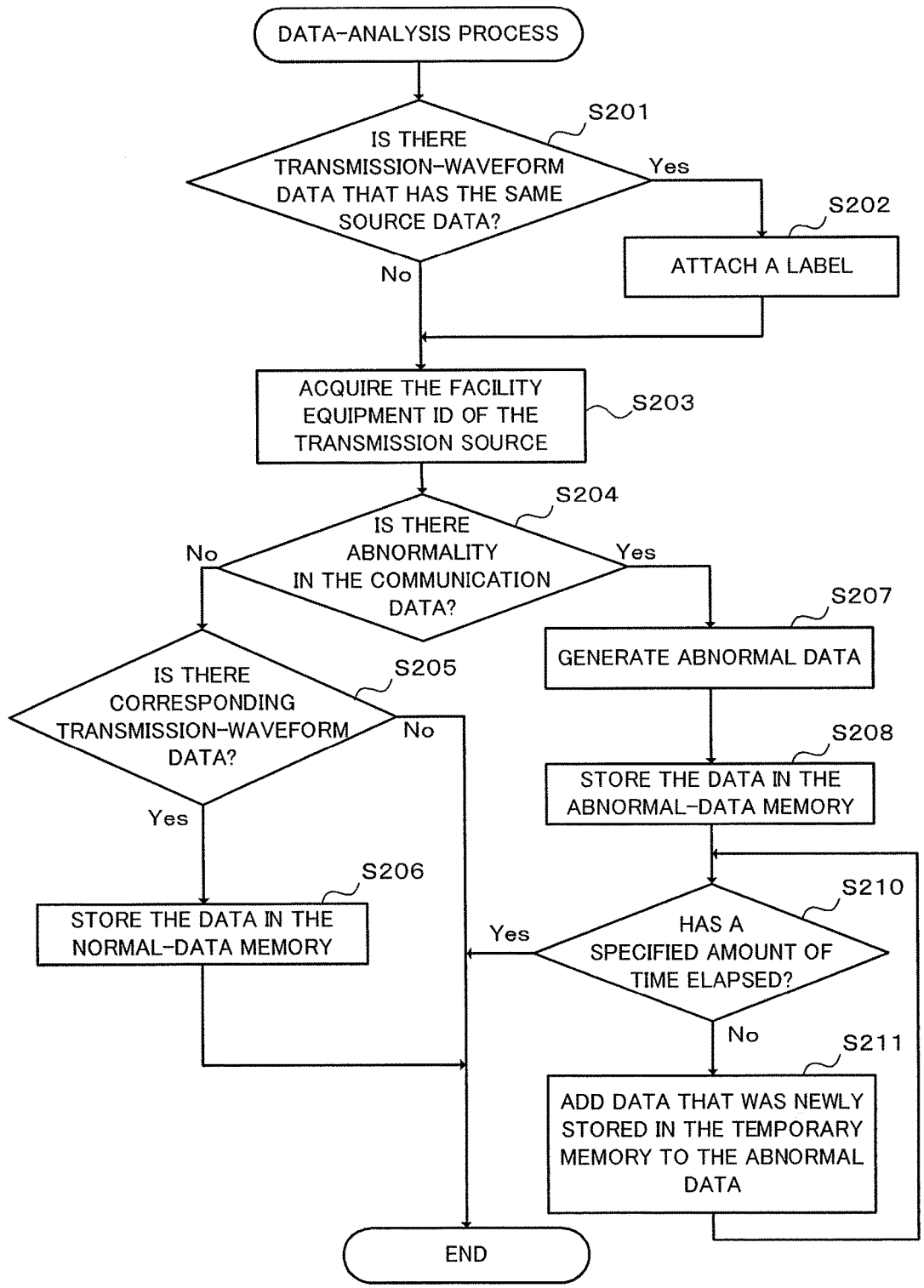
FIG. 7 is an example of a flowchart of a data-analysis process.

Next, the data-analysis process will be explained. The data-analysis process analyzes the communication data that is stored in the temporary memory 310, and based on the analysis results, causes the data that is stored in the temporary memory 310 to be stored in the normal-data memory 320 or abnormal-data memory 330. FIG. 7 is an example of a flowchart of the data-analysis process. The data-analysis process, for example, is repeatedly executed at specified time intervals, and is started when a specified amount of time has elapsed from the time when the previously executed data-analysis process ended.

The correlator 422 determines whether or not transmission-waveform data 316 that has the same source data as the communication data 312 that is stored in the temporary memory 310 is stored in the temporary memory 310 (step S201).

When the correlator 422 has determined that transmission-waveform data 316 that has the same source data as the communication data 312 that is stored in the temporary memory 310 is stored in the temporary memory 310 (step S201: YES), the correlator 422 attaches a label 317 to the communication data 312, and to the transmission-waveform data 316 that was determined to have the same source data as the communication data 312 (step S202).

When the correlator 422 has determined that transmission-waveform data 316 that has the same source data as the communication data 312 that is stored in the temporary memory 310 is not stored in the temporary memory 310 (step S201: NO), the correlator 422 advances to the processing of step S203.

The transmission-source identifier 423 analyzes the communication data 312 that is stored in the temporary memory 310, and acquires the facility equipment ID that corresponds to the facility equipment that is the transmission source of the communication data 312 (step S203).

The abnormality determiner 424 analyzes the communication data 312 that is stored in the temporary memory 310, and determines whether or not there is abnormality in the communication data 312 (step S204). More specifically, the abnormality determiner 424 determines whether or not there is an error in the communication data 312 that is defined by the communication protocol, and when there is an error in the communication data 312, acquires the type of that error.

When the abnormality determiner 424 has determined that there is no abnormality in the communication data 312 (step S204: NO), the data copier 425 determines whether or not transmission-waveform data 316 that is correlated with the communication data 312 that was determined to have no abnormality is stored in the temporary memory 310 (step S205). More specifically, the data copier 425 determines whether or not transmission-waveform data 316 to which a label 317 is attached that is the same as the label 317 of the communication data 312 that was determined to have no abnormality is stored in the temporary memory 310.

When it is determined that transmission-waveform data 316 that is correlated with communication data 312 that was determined to have no abnormality in the communication data is stored in the temporary memory 310 (step S205: YES), the data copier 425 causes that communication data 312 to be saved as communication data 321, the communication time stamp 311 to be saved as time stamp 323, the correlated transmission-waveform data 316 to be saved as transmission-waveform data 322, and the facility equipment ID that was acquired by the transmission-source identifier 423 to be saved as facility equipment ID 324 in the normal-data memory 320 (step S206).

When it is determined that transmission-waveform data 316 that is correlated with communication data 312 that was determined to have no abnormality in the communication data is not stored in the temporary memory 310 (step S205: NO), the data copier 425 ends this process.

When the abnormality determiner 424 has determined that there is abnormality in the communication data (step S204: YES), the data copier 425 generates abnormal data that includes all of the data stored in the temporary memory 310 (step S207). More specifically, the data copier 425 generates abnormal data 370 the includes all of the communication time stamps 311, communication data 312, control-target IDs 313, control states 314, waveform time stamps 315, transmission-waveform data 316, labels 317 that are stored in the temporary memory 310 as communication time stamps 371, communication data 372, control-target IDs 373, control states 374, waveform time stamps 375, transmission-waveform data 376 and labels 377, respectively.

The data copier 425 causes the communication time stamp 311 of the communication data 312 that was determined to have abnormality to be saved as the time stamp 340, the facility equipment ID of the transmission source of communication data 312 that was determined to have abnormality to be saved as the abnormal-facility-equipment ID 350, and the type of abnormality of the communication data 312 that was determined to have abnormality to be saved as the abnormality type 360 in the abnormal-data memory 330, and correlates that data with the abnormal data 370 that was generated in step S207 (step S208).

After executing the processing in step S208, the data copier 425 determines whether or not a specified amount of time has elapsed (step S209).

After executing the processing in step S208, when it is determined that a specified amount of time has not elapsed (step S209: NO), the data copier 425 newly adds all of the communication time stamps 311, communication data 312, waveform time stamps 315 and transmission-waveform data 316 to be saved as communication time stamps 371, communication data 372, waveform time stamps 375 and transmission-waveform data 376, respectively, to the abnormal data 370 that was stored in step S208 (step S210).

After executing the processing of step S208, when it is determined that a specified amount of time has elapsed (step S209: YES), the data copier 425 ends this process.

Next, the data-display process will be explained. The data-display process is a process for displaying data that has been fetched from the normal-data memory 320 and abnormal-data memory 330 on the display 240 according to an input operation that was received by the input device 230. FIG. 8 is an example of a flowchart of the data-display process. The data-display process, for example, starts when a user inputs operation input via the input device 230 indicating an instruction to start the data-display process.

The display controller 426 causes a screen to be displayed on the display 240 for the user to search abnormal data (step S301). More specifically, the display controller 426 displays a list of time stamps 340, abnormal facility equipment IDs 350, and abnormality types 360 that are stored in the abnormal-data memory 330, and displays an input form for the user to input a key that is used when searching abnormal data. As the search key it is possible to use information (data identification information) that identifies data from the displayed list such as a time stamp, facility equipment ID or abnormality type. The display controller 426 causes an input form to be displayed for each search key.

The display controller 426 determines whether or not time stamp data was inputted to the time stamp input form via the input device 230 (step S302).

When it is determined that data was inputted to the time stamp input form (step S302: YES), the display controller 426 acquires time stamps 340 from among the time stamps 340, abnormal facility equipment IDs 350 and abnormality types 360 in the abnormal-data memory 330 that match the inputted data, and causes a list of abnormal facility equipment IDs 350 and abnormality types 360 that correspond to the acquired time stamps 340 to be replaced in the place of the list that was displayed in step S301 (step S303).

When the data that was inputted to the time stamp input form is data that indicates a specified period from a certain time to another time, the display controller 426 can acquire time stamps 340 that are included in that specified period, and cause a list of abnormal facility equipment IDs 350 and abnormality types 360 that correspond to the acquired time stamps 340 to be replaced in the place of the list that was displayed in step S301.

When it is determined that data has not been inputted to the time stamp input form (step S302: NO), the display controller 426 determines whether or not data has been inputted to the facility equipment ID input form (step S304).

When it is determined that data was inputted to the facility equipment ID input form (step S304: YES), the display controller 426 acquires abnormal facility equipment IDs 350 from among the time stamps 340, abnormal facility equipment IDs 350 and abnormality types 360 in the abnormal-data memory 330 that match the inputted data, and causes a list of time stamps 340 and abnormality types 360 that correspond to the acquired abnormal facility equipment IDs 350 to be replaced in the place of the list that was displayed in step S301 (step S305).

When it is determined that data has not been inputted to the facility equipment ID input form (step S304: NO), the display controller 426 determines whether or not data has been inputted to the abnormality type input form (step S306).

When it is determined that data was inputted to the abnormality type input form (step S306: YES), the display controller 426 acquires abnormality types 360 from among the time stamps 340, abnormal facility equipment IDs 350 and abnormality types 360 in the abnormal-data memory 330 that match the inputted data, and causes a list of time stamps 340 and abnormal facility equipment IDs 350 that correspond to the acquired abnormality types 360 to be replaced in the place of the list that was displayed in step S301 (step S307).

When it is determined that data has not been inputted to the abnormality type input form (step S306: NO), the display controller 426 determines whether or not data has been inputted to the data-identifying-information input form (step S308).

When it is determined that data has been inputted to the data-identifying-information input form (step S308: YES), the display controller 426 acquires from the abnormal-data memory 330, abnormal data 370 that corresponds to the time stamp 340, abnormal facility equipment ID 350 and abnormality type 360 that is identified by the inputted data, and causes that data to be displayed on the display 240 (step S309).

The display controller 426 acquires from the normal-data memory 320, transmission-waveform data 322 that corresponds to the facility equipment ID 324 that matches the abnormal facility equipment ID 350 that was identified by the data that was inputted in step S309, and causes that data to be displayed (step S310). This process then ends.

As was explained above, the facility management device 200 of this embodiment constantly stores communication data and the transmission-waveform data of that communication data before and after abnormal communication occurs. Therefore, a worker that is dealing with that abnormal communication is able to easily acquire communication data and transmission-waveform data from the time at which abnormal communication occurred. Consequently, that worker is able to quickly resolve the abnormal communication by analyzing in detail the abnormal communication using the acquired communication data and transmission-waveform data.

The facility management device 200 stores a facility equipment ID that correlates to the facility equipment that is the communication data source that was determined to have an abnormality. Therefore, a worker is able to easily identify the facility equipment that is the source of communication data that was determined to have an abnormality.

The facility management device 200 stores the control state of facility equipment before and after abnormal communication occurred. Therefore, a worker is able to easily know how facility equipment was being controlled at the time when abnormal communication occurred. Moreover, by generating communication data based on the stored control state and transmitting that communication data to facility equipment, the facility management device 200 is able to reproduce the control state of the facility equipment at the time when abnormal communication occurred. Therefore, a worker is able to easily perform detailed analysis of abnormal communication.

The facility management device 200 also stores communication data that was determined to have no abnormality and the transmission-waveform data for that communication data for each of the facility equipment that is a transmission source of that communication data. Therefore, a worker is able to compare transmission-waveform data that was transmitted by certain facility equipment when communication was normal with transmission-waveform data when there is abnormality in the communication. The worker is then able to know the characteristics of the change in shape of the waveform indicated by the transmission-waveform data, and thus is able to easily identify the cause of abnormal communication.

An embodiment of the present disclosure was explained above, however, the present disclosure is not limited by the embodiment.

For example, in the embodiment described above, the facility management device 200 that manages air-conditioning equipment as an example of facility equipment was explained. However, the present disclosure can also be applied to a system that manages facility equipment other than air-conditioning equipment. The present disclosure, for example, can be applied to a system that controls lighting that is installed in a building, or to a home-network management device that performs overall control of electric appliances that are connected to a network in a typical home.

Moreover, the facility management device 200 of the embodiment described above generates communication data for controlling facility equipment and transmits that communication data to the facility equipment. However, the facility management device does not need to generate and transmit communication data. In other words, the function of the operation controller 410 of the embodiment described above can also be achieved by an information-processing device that is separate from the facility management device 200. In that case, the communication-data analyzer 420 functions also as a control-information acquirer 411 and control-state setter 412, as a result, the facility management device can constantly store communication data and transmission-waveform data for that communication data before and after abnormal communication occurs in the same way as the facility management device 200 of the embodiment above.

The facility management device 200 can also be achieved by a general-purpose personal computer, or a terminal device that is installed in the wall of a building.

The facility management device 200 can also comprise an interface for connecting to a wide area network, and can be connected to network storage via that wide area network. The network storage can function as the memory 300.

Acquiring communication data and acquiring the transmission waveform were executed using separate construction, however, acquisition is not limited to this. The order of acquisition is also not limited. It is possible to acquire the transmission waveform first, and then analyze that transmission waveform and acquire the communication data.

In the embodiment described above, the program executed by the facility management device 200 can be stored and distributed on a computer readable non-transitory recording medium such as a flexible disk, CD-ROM (Compact Disk Read-Only Memory), DVD (Digital Versatile Disk), MO (Magneto-Optical Disk) and the like. Moreover, the system that executes the processing described above can also be constructed by installing that program on an information-processing device such as a personal computer.

The program can also be stored on a disk apparatus of a predetermined server on a communication network such as the Internet. The program can also be constructed such that the program can be superimposed on a carrier wave and downloaded, for example.

When the functions described above are allocated and achieved by the OS (Operating System), or by the OS and application software working together, it is possible to store and distribute the portion of the program that is not for achieving the functions of the OS on a non-transitory recording medium and to download only that portion.

The present disclosure can be embodied in various ways and can undergo various modifications without departing from the broad spirit and range of the disclosure. Moreover, the embodiment described above is for explaining the present disclosure, and does not limit the range of the disclosure. In other words, the range of the present disclosure is as set forth in the Claims and not the embodiment. Various changes and modifications that are within the range disclosed in the Claims or that are within a range that is equivalent to the Claims of the disclosure are also included within the range of the present disclosure.

INDUSTRIAL APPLICABILITY

The present disclosure is suitable for a facility management device that manages communication data that is transmitted and received between a plurality of facility equipment.

The invention claimed is:

1. A facility management device that manages communication data that is transmitted and received between a plurality of facility equipment, comprising:
    a communicator that receives the communication data;
    a transmission-waveform data acquirer that acquires transmission-waveform data for the communication data;
    a temporary-memory controller that causes the communication data that was received by the communicator and the transmission-waveform data that was acquired by the transmission-waveform data acquirer to be stored for a specified amount of time in a temporary memory;
    an abnormality determiner that determines whether or not there is abnormality in the communication data that is stored in the temporary memory; and
    a data copier that, when the abnormality determiner determined that there is abnormality in the communication data, causes the communication data and the transmission-waveform data that are stored in the temporary memory to be stored in an abnormal-data memory.

2. The facility management device according to claim 1, comprising
    a transmission-source identifier that identifies facility equipment that is the transmission source of the communication data; and wherein
    the data copier, when the abnormality determiner determined that there is abnormality in the communication data, causes facility-equipment-identifying information that identifies the facility equipment that is the transmission source of communication data that was determined to have abnormality to be stored in the abnormal-data memory.

3. The facility management device according to claim 1, further comprising
    a control-state setter that, based on communication data that was received by the communicator, sets a control state for the facility equipment; and wherein
    the temporary-memory controller causes the control state and control-target-facility-equipment-identifying information that identifies the facility equipment that is controlled in the control state to be stored for a specified amount of time in the temporary memory.

4. The facility management device according to claim 1, further comprising
    a correlator that correlates the communication data that is stored in the temporary memory with the transmission-waveform data that is stored in the temporary memory and that has the same source data as the communication data.

5. The facility management device according to claim 4, further comprising
    a display controller that causes data that is stored in the abnormal-data memory to be displayed on a display.

6. The facility management device according to claim 5, wherein
    the data copier, when the abnormality determiner determined that there is no abnormality in the communication data, correlates, of the communication data and transmission-waveform data that are stored in the temporary memory, the communication data that was determined to not have abnormality and the transmission-waveform data that was correlated with that communication data with facility-equipment-identifying information that identifies the facility equipment that is the transmission source of that communication data, and causes that data to be stored in a normal-data memory.

7. The facility management device according to claim 6, wherein
    the display controller acquires from the normal-data memory transmission-waveform data that corresponds to facility-equipment identifying information that identifies facility equipment that is the transmission source of communication data that was determined by the abnormality determiner to have abnormality, and causes that acquired transmission-waveform data to be displayed on the display.

8. A facility management system comprising:
    a plurality of facility equipment that is connected so that data communication is possible; and
    the facility management device according to claim 1 that manages communication data that is transmitted and received between the plurality of facility equipment.

9. A facility management method for managing communication data that is transmitted and received between a plurality of facility equipment, comprising:
    a step that receives the communication data;
    a step that acquires transmission-waveform data for the communication data;
    a step that causes the received communication data and the acquired transmission-waveform data to be stored for a specified amount of time in a temporary memory;
    a step that determines whether or not there is abnormality in the communication data that is stored in the temporary memory; and
    a step that, when it was determined that there is abnormality in the communication data, causes the communication data and the transmission-waveform data that are stored in the temporary memory to be stored in an abnormal-data memory.

10. A non-transitory computer-readable recording medium recording a program for causing a computer that manages communication data that is transmitted and received between a plurality of facility equipment to execute:
- a step that receives the communication data;
- a step that acquires transmission-waveform data for the communication data;
- a step that causes the received communication data and the acquired transmission-waveform data to be stored for a specified amount of time in a temporary memory;
- a step that determines whether or not there is abnormality in the communication data that is stored in the temporary memory; and
- a step that, when it was determined that there is abnormality in the communication data, causes the communication data and the transmission-waveform data that are stored in the temporary memory to be stored in an abnormal-data memory.

* * * * *